United States Patent [19]
Mogi et al.

[11] Patent Number: 4,743,968
[45] Date of Patent: May 10, 1988

[54] ELECTRONIC APPARATUS CONTROL SYSTEM

[75] Inventors: Takao Mogi; Masayuki Suematsu, both of Tokyo; Kosuke Fujita, Kanagawa, all of Japan

[73] Assignee: Sony, Tokyo, Japan

[21] Appl. No.: 831,876

[22] Filed: Feb. 24, 1986

[30] Foreign Application Priority Data

Mar. 5, 1985 [JP] Japan ................................. 60-043384

[51] Int. Cl.$^4$ ............................................. H04N 5/44
[52] U.S. Cl. .................................. 358/147; 358/194.1
[58] Field of Search ............... 358/147, 146, 142, 188, 358/903, 194.1, 191.1; 455/186

[56] References Cited

U.S. PATENT DOCUMENTS 4,338,632  7/1982  Falater ............................ 358/194.1
4,535,362  8/1985  Gerot ............................. 358/194.1

FOREIGN PATENT DOCUMENTS 3136355  3/1983  Fed. Rep. of Germany .

OTHER PUBLICATIONS

"Small area networks using serial data transfer Part 1-the I$^2$C and Clips" Electronic Engineering, 1/84 vol. 56 #685 pp. 41-48.

Fischer, Thomas, "Digital VLSI breeds next-generation TV receivers" Electronics International 8/81 vol. 54 #16 pp. 97-103.

"The Polybus: A flexible and Foult-Tolerant Multiprocessor Interconnection" by Männer et al. Interfaces in computing vol. 2, pp. 45-68 1984.

"Microprocessor adds flexibility to television control system" by Kaore Karstad Electronics vol. 52, #2 pp. 132-138 11/79.

Primary Examiner—James J. Groody
Assistant Examiner—David E. Harvey
Attorney, Agent, or Firm—Lewis H. Eslinger

[57] ABSTRACT

A system for controlling electronic apparatus, such as a television receiver, which employs a control circuit having a control program in a read only memory to sequentially communicate over an internal system bus in a predetermined interval with a plurality of controllable, operational circuit blocks forming the electronic apparatus, in which the control circuit selects a specific circuit block for data transfer upon a request signal. In one embodiment, a request signal is transmitted prior to a vertical blanking interval in a television signal and in another embodiment, a dedicated line is provided from a selected controllable unit to the control unit, whereby the request signal can be transmitted at any time, irrespective of whether data is being transferred at such time.

2 Claims, 4 Drawing Sheets

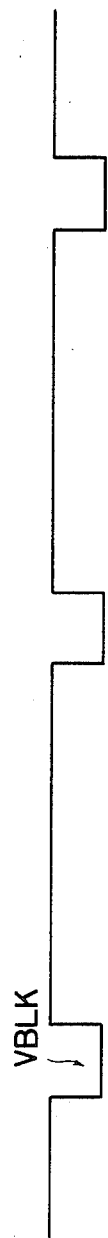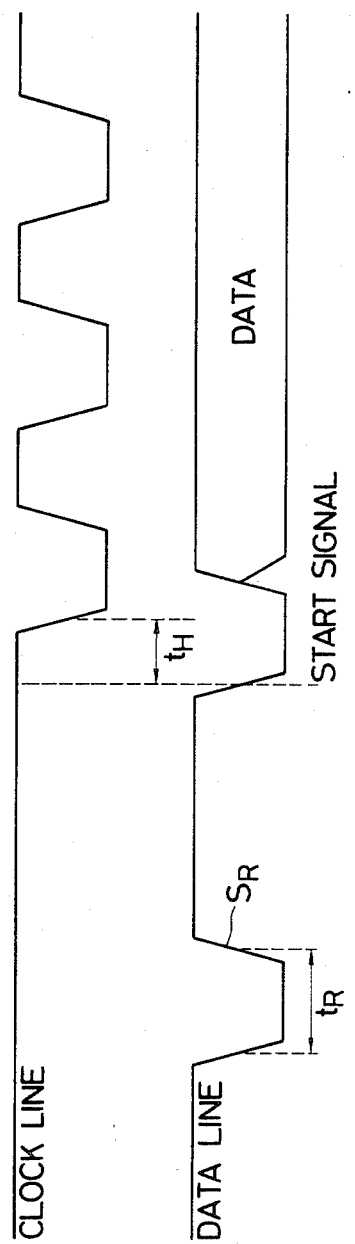

ELECTRONIC APPARATUS CONTROL SYSTEM

BACKGROUND OF THE INVENTION

1. Field of the Invention

This invention relates generally to a control system for controlling electronic apparatus and, particularly, to a control system that is adapted to digitally control internal circuitry of video and audio equipment.

2. Description of the Background

Video and audio equipment, such as TV receivers, video tape recorders, and audio tape recorders, that include digital control circuitry are becoming quite prevalent. This kind of digital control circuitry typically employs a microprocessor arrangement and utilizes an internal or inner system bus to facilitate communication between the microprocessor and the various functional blocks of the particular piece of equipment. Generally, when employing the internal bus, a central processing unit (CPU), a read only memory (ROM), and the like are incorporated, which communicate by means of the bus. Operational preset data for each of the various functional circuits is stored in the read only memory and, in normal operation, the preset data is read out from the read only memory under control of the central processing unit. The data so read out from the read only memory is supplied to a predetermined controllable circuit, such as the video processor in a television receiver through the internal bus, so as to permit that particular circuit to perform a predetermined operation. In this approach employing an internal bus, typically each operational system can also be selectively controlled by the central processing unit upon actuation of an external unit, such as a keyboard or remote control unit. The internal bus used in this kind of system can use various communication schemes, such as that disclosed in Japanese patent application No. 57/106262, in which the bus line is a two-wire bus comprised of a data line and a clock line.

In addition, video and audio equipment employing the above-described internal bus system is also advantageously adapted to undergo adjustment procedures during manufacture and maintenance or repair using the control circuitry already in place by connection through a jack or by remote control interface. This permits both standardization of the adjustments of the circuitry, as well as simplification thereof, and leads to overall cost reductions both during manufacture and repair.

Typical of the units employed in a television receiver that may be controlled in such a system are the audio processing circuit, video control circuit, video processor, deflection control circuit, and the tuning circuit. Subsequently, when the television receiver receives control commands fed by the remote control commander or manual keyboard, the central processing unit controls the specific controllable circuit in response to the commands, which might involve tuning, volume adjustment, picture adjustment, and the like.

During the control operation of the various kinds of equipment under discussion here, when the control signals are fed from the main central processing unit to the specific controllable circuits, data representing the control or state contents of the signal are transmitted together with clock signals. In such situation, it has been found that when the clock signal frequency is increased, radio frequency interference due to noise from the clock pulses will appear on the cathode ray tube of the particular piece of apparatus. Accordingly, it is known to avoid such display noise and to transmit data only during the vertical blanking interval of the video signal.

This transmission of data during the vertical blanking interval has lead to the following problem. Because the vertical blanking interval provided for data transmission has only a time interval of 1.17 to 1.33 milliseconds, when data is transmitted in this interval using clock signals having a frequency of 100 kHz, only approximately 117-bytes of data can be transmitted during one vertical blanking interval. Therefore, when 1 byte of data is transmitted with a 1-bit acknowledge bit, then only 13-bytes (117÷9) can be transmitted.

Therefore, it can be seen that the amount of data that may be transmitted during one vertical blanking interval is severely limited and, thus, the number of communications that can be achieved between the main central processing unit and the various controllable circuits is also limited. Moreover, when the wait time and the like is considered, in some cases the main central processing unit may not be able to check the operational states of all of the controllable circuits within a single vertical blanking interval. In that case, the central processing unit is forced to check the various circuits in the next successive vertical blanking interval and this can result in an unacceptably long response time in the particular piece of equipment.

OBJECTS AND SUMMARY OF THE INVENTION

Accordingly, it is an object of the present invention to provide an electronic apparatus control system that can eliminate the above-noted defects inherent in the prior art.

Another object of this invention is to provide an electronic apparatus control system wherein specific controllable circuits transmit to a control circuit a request signal that requests communication with priority over other controllable circuits.

A further object of this invention is to provide an electronic apparatus control system for use with apparatus dealing with television signals, wherein communication between a central control circuit and a plurality of controllable circuits is performed only during a vertical blanking interval of the television signal.

It is still another object of this invention to provide an electronic apparatus control system for use with apparatus dealing with television signals, wherein a control circuit and a plurality of controllable operational circuits are connected together through a two-wire bus, and a request signal from a specific controllable circuit is supplied to a main control circuit through a data line that forms one of the wires of the bus.

A still further object of this invention is to provide an electronic apparatus control system for use with apparatus dealing with television signals, wherein a main control circuit and a specific one of a number of controllable circuits are connected through a dedicated line for transmitting a request signal.

In accordance with an aspect of the present invention, a control system is provided for electronic apparatus of the kind having a main control circuit with a control program in a read only memory that sequentially communicates with a plurality of various operational circuits to be controlled through a bus within a predetermined interval. The control circuit selects a specific block for control upon a request signal therefrom, so that the control circuit selects one of the controllable circuits for data transfer. The bus may comprise a two-wire internal bus system and the circuit that requires a particularly fast response is controlled or checked over the bus lines with priority over the other operational circuits in the apparatus.

In one embodiment the request signal is transmitted between the main control unit and the specific controllable unit by means of one of the wires in the two-wire bus during times other than the vertical blanking interval, and in a second embodiment such request signal is fed between the two units of interest over a separate dedicated line at any time, including during the vertical blanking interval.

The above and other objects, features, and advantages of the present invention will become apparent from the following detailed description of illustrative embodiments thereof to be read in conjunction with the accompanying drawings, in which like reference numerals represent the same or similar elements.

BRIEF DESCRIPTION OF THE DRAWINGS

FIGS. 2A to 2C are waveform diagrams explaining data transfer in a two-wire bus system to which the present invention is applied;

FIGS. 3A to 3C are waveform diagrams useful in explaining a mode of operation according to a first embodiment of the present invention;

DETAILED DESCRIPTION OF PREFERRED EMBODIMENTS

Figure 1:
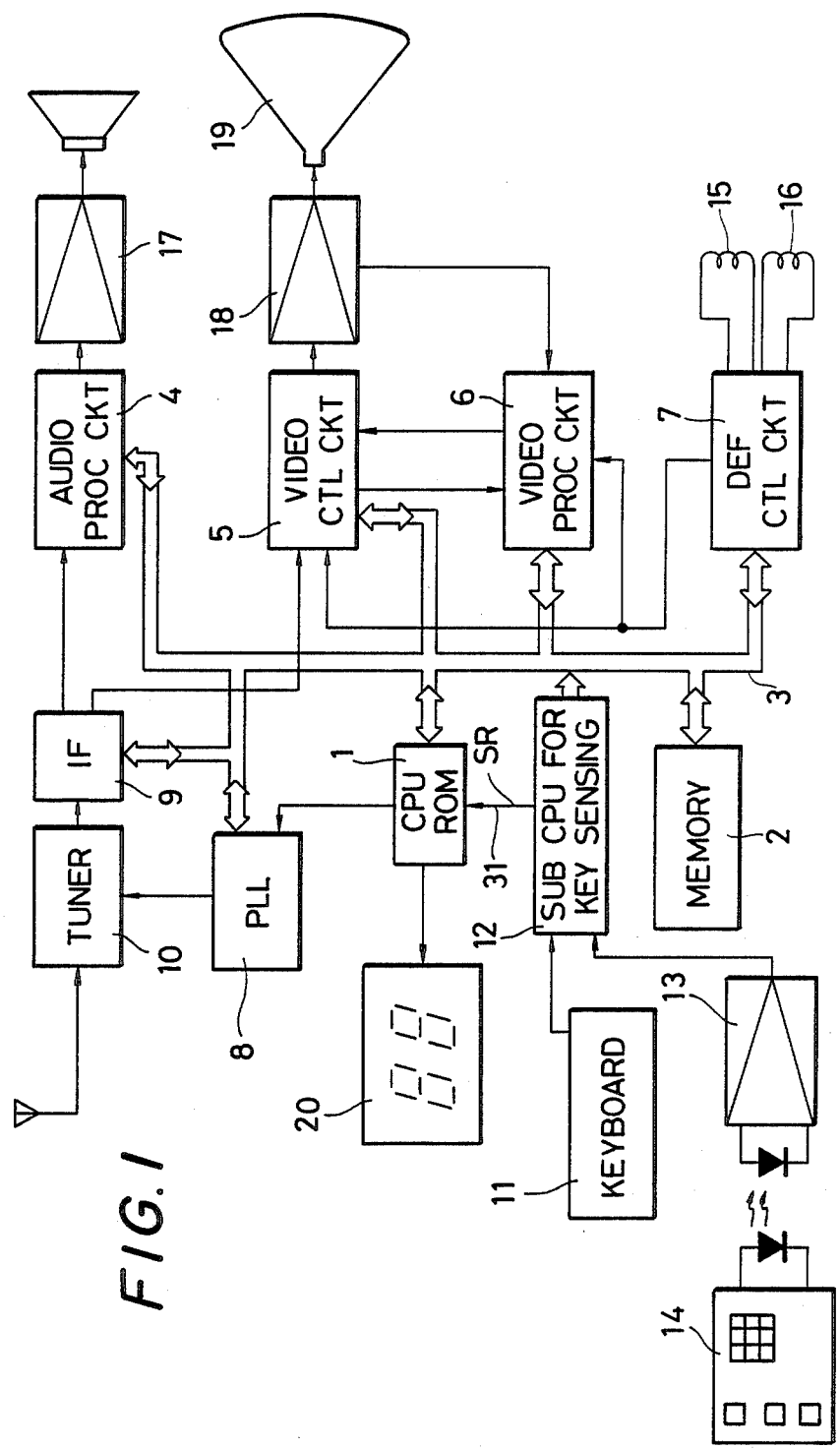
FIG. 1 is a schematic in block diagram form of a television receiver according to the present invention.

A television receiver employing an internal bus to which the present invention is applicable is represented in FIG. 1, in which a main central processing unit 1 can include a read only memory containing a control program, as in a known configuration, and central processing unit 1 also communicates with a memory 2 over an internal bus 3. The various controllable circuits are represented as an audio processing circuit 4, a video control circuit 5, a video processing circuit 6, a deflection control circuit 7, a phase-lock loop (PLL) circuit 8, and an intermediate frequency (IF) circuit 9. A keyboard 11 is provided for use in supplying commands and also included is remote control system comprising a remote control signal receiving circuit 13 and a remote control signal transmitter unit 14. When the television receiver of FIG. 1 is operative, commands are supplied from keyboard 11 or remote control commander 14 to central processing unit 1 through a sub-central processing unit 12 that is employed for key sensing, that is, that decodes the inputs from keyboard 11 and remote control commander 14. The main central processing unit 1 then controls the various operational circuits 4 through 9 in response to the appropriate commands. Typical of such control operations are tuning, volume adjustment, picture adjustment and the like, with the resultant adjustments being displayed on a visual display section 20. In addition to controlling the various circuits, main central processing unit 1 also constantly checks the operational states of the various circuits 4 through 9 so that they all operate in the their respective predetermined states. Included in the operational circuits of the television receiver represented in FIG. 1 are deflection coils 15 and 16, an audio output amplifier 17, a video output amplifier 18, and a cathode ray tube 19. These latter units are not directly under the control of central processing unit 1 but are indirectly controlled.

Now that the various hardware elements of a television receiver that is particularly adapted for use with the present invention have been briefly described in relation to FIG. 1, attention is directed to FIGS. 2A to 2C, in which the timing of a two-wire bus system having a data line and a clock line, such as shown at 3 in FIG. 1, is described relative to the vertical blanking signal. More particularly, in a two-wire bus system, only during the vertical blanking interval (VBLK) shown in FIG. 2A, are clock pulses transmitted through the clock line, as represented by the vertical lines in FIG. 2B, and only during the vertical blanking interval VBLK is data transmitted through the data line, as represented in FIG. 2C.

In a first embodiment according to the present invention, a specific controllable circuit, such as one of circuits 4 through 9 in FIG. 1, transmits a request signal $S_R$ to a control circuit, such as central processing unit 1, using two-wire bus 3. When a request signal $S_R$ is transmitted through the above-described two-wire bus system, it is transmitted through the data line having the specific timing represented in FIGS. 3A through 3C. More specifically, if the data line transmits a negative going pulse before the vertical blanking interval VBLK, this represents a request ($S_R$) for accessing the priority circuit, that is, for data transfer from the central processing unit to that circuit to the exclusion of the other circuits.

When data is transmitted through the two-wire bus system, as described above with regard to FIGS. 2A to 2C, a low level state "L" of the data line is regarded as a communication start signal, as represented in FIG. 3C, when the data line goes to a low level state "L", while the clock line is at a high level state "H", as represented in FIG. 3B, and the vertical blanking signal is at a low level state "L", as shown in FIG. 3A. A clock pulse is transmitted after a time $t_H$ from the start signal and data is then transmitted in synchronism with that clock signal. More particularly, FIG. 3A shows a falling edge of the vertical blanking interval and the low level state represents the vertical blanking interval of the video signal displayed on the cathode ray tube. FIGS. 3B and 3C represent, respectively, the signals on the two-wire bus, and when the data line in FIG. 3C transmits a negative going pulse before the vertical blanking interval, this represents a request signal $S_R$ for accessing the priority circuitry.

Accordingly, the request signal $S_R$ stays at a low level "L" for a predetermined time interval $T_R$, as shown in FIG. 3C, is output at a time prior to the start signal, and must occur at some time other than during the vertical blanking interval, represented in FIG. 3A. Then, the time interval $t_R$ is set to satisfy the relation $t_H < t_r < t_x$, where $t_x$ equals a predetermined time interval that determines system response time. When this relationship is satisfied, any level changes within the time interval $t_H$ are determined to be noise and will be excluded from signal processing in the two-wire bus system.

When the control circuit, such as the central processing unit, receives a request signal $S_R$ from a specific controllable circuit, it communicates with that specific controllable circuit with priority over the other controllable circuits. A circuit that requires a particularly fast response is typically selected as the specific controllable circuit for transmitting the request signal $s_R$. In the case of the television receiver shown at FIG. 1, best results are obtained if the control circuit respond with priority over the other controllable circuits when a request signal is received from the keyboard or from the remote control commander.

Figure 4:
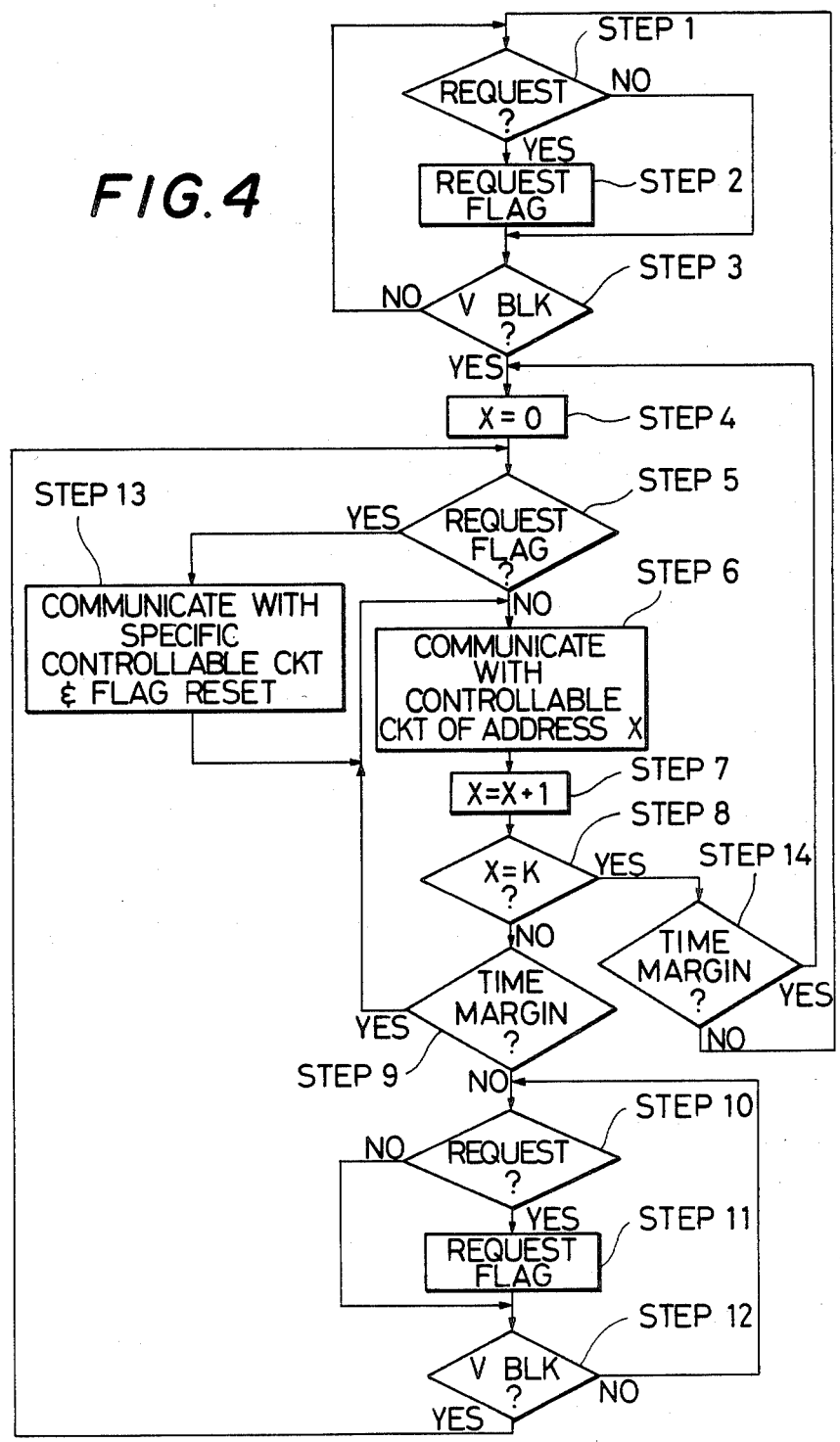
FIG. 4 is a logic flow chart useful in explaining the mode of operation of the first embodiment of the present invention.

FIG. 4 is a flow chart representing particular operational steps performed in the central processing unit by the present invention according to the first embodiment described above, in which at step 1, it is determined whether a request signal $S_R$ has been received and if so, step 2 then requests that a flag be set. In step 3, a decision is made whether the vertical blanking interval is present and, if not, the procedure returns back to step 1 and goes through steps 1, 2, and 3 until a vertical blanking interval arrives. Once the vertical blanking interval is present, an address parameter X is initialized by setting it equal to 0 in step 4 and after this has occurred, the presence of the request flag set in step 2 is checked for in step 5. In the case that the step flag has not yet been set, as determined in step 5, communication with a controllable circuit corresponding to address X is performed at step 6. The controllable circuit being, for example, one of the circuits 4 through 9 as seen in FIG. 1. In the event, however, it is determined in step 5 that the request flag has been set, then the communication with the specific controllable circuit is performed in step 13 and the request flag is reset. Upon such flag reset the procedure moves to step 6 in which communication with the controllable circuit having addresss X takes place. Following such communication, the address X is incremented by one (X+1) in step 7, and then in step 8 it is determined whether the address parameter X has yet reached a predetermined value K. Parameter K is based upon the number of controllable elements provided and the time it takes to communicate with each controllable element, and if it is determined that address parameter X has reached the predetermined value K, it means that the communication cycle for the plurality of controllable circuits has been completed. Step 14 then determines whether there is any time margin remaining for further communication, and if there is no time margin remaining then the procedure returns to step 1 to repeat the same procedure as described above. In this way, it is checked whether the request signal is received and the next vertical blanking interval is awaited. Nevertheless, if it is determined in step 14 that there is a time margin, then the procedure returns to step 4 and the next communication cycle is started once again.

When it is determined in step 8 that the address parameter X has not yet reached the predetermined value K, the time margin is checked in step 9 and the inventive procedure can return to step 6, if there is time available. Note that in step 6, communication with the next controllable circuit is performed. In this case, if it is determined in step 9 that there is no time margin remaining then the procedure moves to steps 10, 11, and 12 in which it is determined, respectively, if the request signal is received and then the next vertical blanking interval is awaited and when the next vertical interval is reached, the procedure according to the present invention returns to step 5 and the presence of a request flag is determined. Accordingly, the above operation then continues repeatedly.

Figure 5:
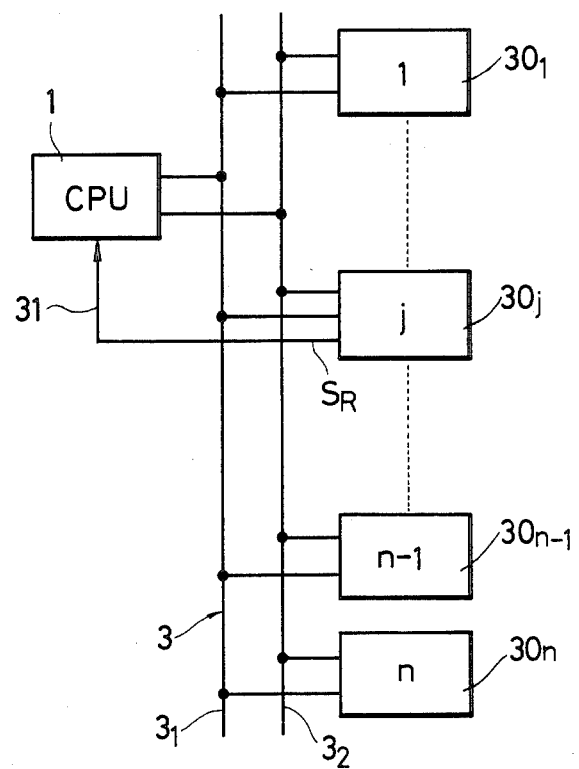
FIG. 5 is a schematic in block diagram form showing a second embodiment of the present invention.

FIG. 5 represents another embodiment of the present invention in which the control circuit, formed as central processing unit 1, is connected to a number of controllable circuits $30_1$ to $30_n$ through two-wire internal bus 3. The bus 3 consists of a clock line $3_1$ and a data line $3_2$ and in this embodiment a controllable circuit $30_j$ is selected as a specific controllable circuit with priority. Circuit $30_j$ and control circuit 1 are connected through a dedicated signal line 31, so that request signal $S_R$ can be transmitted thereover. In addition, when it is assumed that the sub CPU 12 of FIG. 1 is also a specific controllable circuit, a request signal line 31 is also arranged to connect the sub CPU 12 and the main CPU 1.

In the first embodiment described hereinabove, because the request signal $S_R$ is superimposed on the data line, the request signal $S_R$ cannot be generated during the vertical blanking interval (VBLK) or it could not be distinguished from the data. Nevertheless, in the second embodiment as seen in FIG. 5, a dedicated request signal line 31 is additionally provided to transmit only such request signal $S_R$, so that the request signal $S_R$ can be transmitted at any desired time irrespective of the state of the vertical drive signal. Thus, communication with priority can be requested by a selected controllable circuit regardless of whether or not it is within a vertical blanking interval. When a request signal $S_R$ is generated while the control circuit is communicating with another controllable circuit, communication with the circuit that has generated the request as performed after the current communication has been terminated. In the case where communication with a controllable circuit that has generated a request cannot be performed within the current vertical blanking interval because there is insufficient time, or when a communication request is generated at a time outside the vertical blanking interval, then communication is performed with priority in the next successive vertical blanking interval.

Therefore, it can be seen that in electronic apparatus employing an internal bus system a circuit that requires a particular fast response can be controlled or checked with priority over the other circuits by using a request signal, whether or not a dedicated line for that signal is provided, and in video equipment such as television receivers and video tape recorders, efficient communication can be achieved even though communication occurs only during the vertical blanking interval.

Although illustrative embodiments of the invention have been described in detail herein with reference to the accompanying drawings, it is to be understood that the invention is not limited to such precise embodiments and that various changes and modifications can be effected therein by one skilled in the art without departing from the spirit and scope of the invention, as defined in the appended claims.

What is claimed is:

1. A control system for electronic apparatus operating on a television signal having a plurality of controllable operational circuits, comprising:
   a control circuit including a control program stored in a memory;
   an internal bus system including a clock line and a data line connected between said control circuit and said plurality of controllable operational circuits; and
   in which said control circuit includes means for transmitting data over said data line of said bus system to said controllable circuits sequentially only during vertical blanking intervals of said television signal, means for receiving a data request signal from a predetermined one of said operaitonal circuits, and means for selecting said predetermined one of the controllable operational circuits for the transmission of said data with priority over other ones of said controllable operational circuits upon transmission of said data request signal which is transmitted over said data line at a time other than during said vertical blanking interval.

2. A method of controlling an electronic apparatus having a control circuit, a plurality of controllable operational circuits, and an internal bus including a clock line and a data line, the apparatus utilizing a television signal, comprising the steps of:

determining the presence of successive vertical blanking intervals in the television signal;

transmitting data to said plurality of controllable operational circuits only during said vertical blanking intervls;

providing priority to a selected one of said plurality of controllable operational circuits by receiving a request signal represented as a low level on the data line of the bus;

detecting when said low level occurs at a time before a time of occurrence of one of said vertical blanking intervals; and starting data transmission to the selected one upon the occurrence of said one of said successive vertical blanking intervals.

* * * * *

UNITED STATES PATENT AND TRADEMARK OFFICE
CERTIFICATE OF CORRECTION

PATENT NO. : 4,743,968
DATED : May 10, 1988
INVENTOR(S) : Takao Mogi et al.

It is certified that error appears in the above-identified patent and that said Letters Patent is hereby corrected as shown below:

Column 4, line 61, after "tr" delete ","

IN THE CLAIMS:

Column 7, line 2, change "operaitonal" to --operational--.

Column 8, line 5, change "intervls" to --intervals--.

Signed and Sealed this

Tenth Day of January, 1989

Attest:

DONALD J. QUIGG

*Attesting Officer*  *Commissioner of Patents and Trademarks*